Aug. 2, 1960    G. A. LYON    2,947,573
WHEEL COVER
Filed April 15, 1957
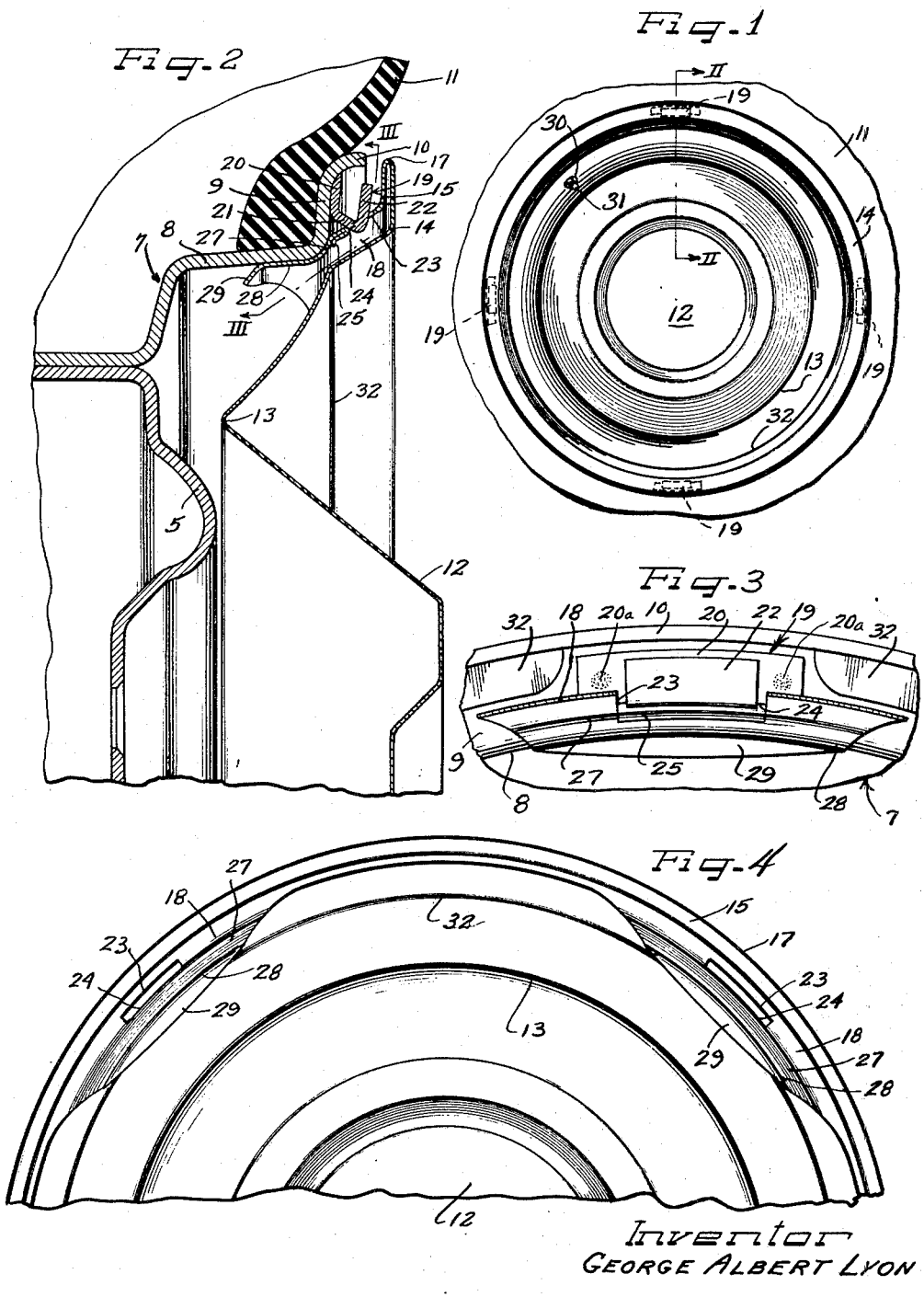
Inventor
GEORGE ALBERT LYON

United States Patent Office 2,947,573
Patented Aug. 2, 1960

2,947,573

WHEEL COVER

George Albert Lyon, 13881 W. Chicago Blvd., Detroit 28, Mich.

Filed Apr. 15, 1957, Ser. No. 652,755

9 Claims. (Cl. 301—37)

The present invention relates to improvements in wheel structures and more particularly concerns the ornamental and the protective covering of the outer sides of vehicle wheels.

An important object of the present invention is to provide an improved wheel structure wherein a cover is not only supported effectively in axial disposition relative to the wheel but also is provided with efficient cover retaining and centering means.

Another object of the invention is to provide improved means for retaining a wheel cover on the outer side of the vehicle wheel.

A further object of the invention is to provide improved theft discouraging means for wheel covers.

Still another object of the invention is to provide improved means for retaining a wheel cover on the outer side of a vehicle wheel by engagement with retaining structure on the terminal flange of the tire rim while nevertheless enabling the effective wheel balancing by the provision of the wheel balancing weights on the terminal flange behind the margin of the cover.

Other objects, features and advantages of the present invention will be readily apparent from the following detailed description of a preferred embodiment thereof taken in conjunction with the accompanying drawings in which:

Figure 1 is an outer side elevational view of a wheel structure embodying features of the invention;

Figure 2 is an enlarged fragmentary radial sectional detail view taken substantially along the line II—II of Figure 1;

Figure 3 is a fragmentary sectional elevational detail view taken substantially on the line III—III of Figure 2; and Figure 4 is a fragmentary rear elevational view of the cover.

A cover embodying features of the present invention is adapted to be applied to the outer side of a vehicle wheel including a disk spider wheel body 5 and carrying a drop center multi-flange tire rim 7 having a generally axially outwardly and radially inwardly facing intermediate flange 8 merging with a generally radially outwardly extending and axially outwardly facing terminal flange portion 9 provided with a generally axially outwardly turned and radially inwardly facing lip portion 10. A pneumatic tire 11 is adapted to be supported by the tire rim and may be of the currently popular tubeless type.

Herein the cover is of the full disk type comprising a sheet metal stamping that is drawn to shape in suitable press equipment and may be made from stainless steel, brass, aluminum or other suitable sheet or strip stock. Centrally the cover has a crown portion 12 which has thereabout an annular inwardly generally dished portion 13 that leads generally radially and axially outwardly to an outer generally radially extending marginal portion 14 dimensioned to overlie the terminal flange 9, 10.

An unturned outer marginal flange 15 affords a turned reinforcing and finishing edge 17 for the cover adapted in assembly to lie opposite the tip of the terminal flange lip 10. This affords a substantially reinforced structure for the outer margin of the cover.

For retaining the cover on the outer side of the wheel in press-on, pry-off relation, the cover is provided behind the outer margin 14 thereof with a plurality of cover retaining flanged fingers 18 which may be conveniently four in number derived from material at four corners of a quadrangular blank from which the cover is made. These fingers are retainingly engageable with corresponding cover retaining lug members 19 each of which is provided with a base flange 20 secured as by means of spot welding 20a to the terminal flange portion 9. Extending generally axially outwardly and sloping radially inwardly from the inner edge of the base flange portion 20 is a cover retaining shoulder portion 21 that merges with a generally radially outwardly extending guard flange 22 overlying the base flange 20. The retaining shoulder flange 21 is disposed on a diameter which is somewhat larger than the diameter at juncture of the intermediate flange 8 with the terminal flange portion 9 so as to provide radially inwardly from the shoulder flange 21 a seating area of the radially inner portion of the terminal flange portion 9. Through this arrangement, the elbow-like juncture between the retaining member flanges 21 and 22 is receivable through a clearance aperture or opening 23 in the retaining finger 18 adjacent to juncture of the finger with the unturned flange 15 substantially as seen in Figure 2. At the axially inner side of the clearance opening 23 is a retaining shoulder 24 that is retainingly engageable under resilient tension with the generally undercut retaining shoulder 21 of the retaining member. For reinforcing purposes, the material struck from the retaining finger body in providing the opening 23 is turned in upon the finger at the inner side of the shoulder 24 to provide a reinforcing lamination 25 (Figs. 2 and 3). It will be observed that at least axially inwardly from the shoulder 24, the retaining finger slopes radially and axially inwardly so that in applying the cover to the outer side of the wheel such portion of the finger will serve as a lead-in to the shoulder 24 and cammingly flex over the elbow juncture between the retaining member flanges 21 and 22 and then enable the retaining shoulder 24 of the finger to snap into engagement behind the shoulder 21 of the retaining member.

For maintaining firm tensioned retaining engagement of the finger shoulder 24 with the retaining member shoulder 21, and for effecting a spacing seat to maintain the cover in otherwise substantially spaced relation to the tire rim and the wheel body, the retaining finger 18 in each instance is provided axially inwardly from the retaining seat 24 with a stepped shoulder 27 which is engageable against the radially inner portion of the terminal flange 9. Beyond the seating shoulder 27, the retaining finger extends generally radially and axially inwardly to fit about the juncture between the intermediate flange 8 and the terminal flange 9, with an axially inner portion 28 of the retaining finger centeringly opposing the axially outer portion of the intermediate flange 8. This also provides an effective buffer and cushion for maintaining the cover against radial displacement in response to road shocks and the like. At its inner extremity, the retaining finger is preferably provided with an inturned reinforcing terminal 29 which also serves to enable inward sliding of the finger extremity incident to applying the cover to the outer side of the wheel without catching of the tip of the finger on the tire rim.

In applying the cover to the outer side of the wheel, a valve stem aperture 30 in the dished portion 13 of the cover is registered with a valve stem 31 and at the same time the adjacent finger or fingers 18 are aligned with the respective retaining members 19 to be engaged thereby. Then the cover is pressed axially inwardly until all of the retaining fingers are engaged with the retaining members, wherein the shoulders 24 of all of the fingers engage the shoulders 21 of all of the retaining members and the seats 27 of the fingers maintain the cover in spaced relation to the wheel and also maintain the shoulders 24 tight against the shoulders 21 of the retaining members, and the axially inner portions 28 of the retaining fingers hold the cover in centered cushioned relation to the wheel.

It will be observed in Figure 3, that by virtue of the substantially radially inwardly spaced relation of the retaining fingers relative to the terminal flange extremity lower lip portion 10, it is entirely feasible to effect balancing of the wheel by the application of the customary type of wheel balancing weight 32 to the terminal flange in the chamber provided behind the cover margin 14. The wheel balancing weights may be located immediately adjacent to and radially outwardly with respect to the retaining finger flange 18 in any given instance and close to the retaining member 19, if required.

For removing the cover from the wheel, a pry-off tool such as a screwdriver or the like may be applied behind the cover margin 14 between the retaining fingers 18 and pry-off force applied to an indented reenforcing and pry-off rib shoulder 32 provided at juncture of the dished cover portion 13 with the marginal portion 14 and located radially inwardly adjacent to the seating portions 27 of the fingers. However, best results are obtained by applying the pry-off tool immediately adjacent to any one of the retaining members 19 and inserting the same behind the seating shoulder 27 of the associated retaining finger, thus serving also as a pry-off shoulder. Since the retaining finger 18 is spaced from the adjacent body portion of the cover in each instance, radially inward deflection of the retaining finger as axially outward pry-off force is applied thereto is enabled so that the retaining shoulder 24 of the retaining finger can be snapped free from the retaining shoulder 21 of the retaining member.

It will be apparent that theft of covers supplied with the cover retaining finger structure 18 of the present invention and the retaining members 19 of the present invention will be substantially discouraged since in order to use the cover on another wheel, such wheel must be equipped with the proper retaining member structure. Furthermore, even though the same type of retaining member structure 19 may be used on a line of vehicles, different models may have the retaining members disposed at different radial positions on the terminal flange, with the retaining fingers of the covers similarly and complementally constructed so that the cover from one model cannot be applied to the other model of automobile.

It is understood that modifications and variations may be effected without departing from the scope of the novel concepts of the present invention.

I claim as my invention:

1. In a wheel structure including a tire rim having a terminal flange including a generally radially extending poriton and a generally axially extending portion at the radially outer side of the radially extending portion, said radially extending portion having thereon cover retaining shoulder means projecting generally axially outwardly from said radially extending portion and providing generally axially inwardly facing shoulders spaced from said axially extending portion, a cover for disposition on the outer side of the wheel including a circular marginal portion provided therebehind with cover retaining flange means affording sockets receptive of said cover retaining shoulder means and having at the axially inner side thereof cover retaining shoulders engageable with the shoulders of said retaining means, said flange means having additional shoulder structures thereon engageable with said radially extending terminal flange portion for determining the axially inward disposition of the cover and for maintaining said socket shoulders in tensioned engagement with the retaining means shoulders.

2. In a wheel structure including a tire rim having a terminal flange including a generally radially extending portion and a generally axially extending portion at the radially outer side of the radially extending portion, said radially extending portion having thereon cover retaining shoulder means projecting generally axially outwardly from said radially extending portion and providing generally axially inwardly facing shoulders spaced from said axially extending portion, a cover for disposition on the outer side of the wheel including a circular marginal portion provided therebehind with cover retaining flange means affording sockets receptive of said cover retaining shoulder means and having at the axially inner side thereof cover retaining shoulders engageable with the shoulders of said retaining means, said flange means having additional shoulder structures thereon engageable with said radially extending terminal flange portion for determining the axially inward disposition of the cover and for maintaining said socket shoulders in tensioned engagement with the retaining means shoulders, said retaining means comprising a circumferential series of angular members welded to said radially extending terminal flange portion.

3. In a wheel structure including a tire rim having a terminal flange including a generally radially extending portion and a generally axially extending portion at the radially outer side of the radially extending portion, said radially extending portion having thereon cover retaining shoulder means projecting generally axially outwardly from said radially extending portion and providing generally axially inwardly facing shoulders spaced from said axially extending portion, a cover for disposition on the outer side of the wheel including a circular marginal portion provided therebehind with cover retaining flange means affording sockets receptive of said cover retaining shoulder means and having at the axially inner side thereof cover retaining shoulders engageable with the shoulders of said retaining means, said flange means having additional shoulder structures thereon engageable with said radially extending terminal flange portion for determining the axially inward disposition of the cover and for maintaining said socket shoulders in tensioned engagement with the retaining means shoulders, said sockets comprising openings punched from the flange means and having material bent from the socket openings aligned in return bent relation along the radially inner side of the flange means and on the axially inner side of the openings in reinforcing relation to the retaining shoulders of the flange means.

4. In a wheel structure including a tire rim having a terminal flange including a generally radially extending portion and a generally axially extending portion at the radially outer side of the radially extending portion, said radially extending portion having thereon cover retaining shoulder means projecting generally axially outwardly from said radially extending portion and providing generally axially inwardly facing shoulders spaced from said axially extending portion, a cover for disposition on the outer side of the wheel including a circular marginal portion provided therebehind with cover retaining flange means affording sockets receptive of said cover retaining shoulder means and having at the axially inner side thereof cover retaining shoulders engageable with the shoulders of said retaining means, said flange means having additional shoulder structures thereon engageable with said radially extending terminal flange portion for determining the axially inward disposition of the cover and for maintaining said socket shoulders in tensioned engagement with the retaining means shoulders, said flange means including axially inward extension structure engageable in centering and cushioning relation with a portion of the tire rim radially and axially inwardly from the radially extending terminal flange portion.

5. In a wheel structure including a tire rim having a terminal flange structure including a generally radially outwardly extending portion and a generally axially outwardly projecting portion, a plurality of separately formed and rigidly secured cover retaining members disposed in circumferentially spaced relation on one of the terminal flange portion and providing generally radially and axially inwardly facing cover retaining shoulders, a cover for disposition at the outer side of the wheel including a circular cover member having an outer marginal portion overlying the tire rim terminal flange and provided therebehind with cover retaining flange means having sockets retainingly interengageable with the cover retaining members and provided with shoulders coacting under resilient tension with said member shoulders in press-on, pry-off relation.

6. In a wheel structure including a terminal flange having generally radially extending and axially extending portions with an intermediate flange joining the radially inner side of the radially extending portion of the terminal flange, a plurality of rigidly secured rigid retaining members on said radially extending terminal flange portion and each provided with a generally radially and axially inwardly facing retaining shoulder spaced substantially radially inwardly from the axially extending terminal flange portion but also spaced radially outwardly relative to the intermediate flange, a cover for disposition at the outer side of the wheel including a circular marginal portion for overlying the terminal flange and having therebehind a plurality of resilient retaining finger members of substantial width and resilient stiffness and each provided with a retaining shoulder interengageable with the retaining shoulder of a respective one of the retaining members, each of said fingers having intermediately thereof and spaced axially inwardly from the retaining shoulder thereof a generally axially inwardly facing shoulder thereof a generally axially inwardly facing shoulder for bottoming engagement with the radially facing terminal flange portion radially inwardly from the retaining member engaged by the finger for determining the axially inward disposition of the cover and maintaining the same in spaced relation to the wheel and also assuring tensioned interengagement of the finger and retaining member shoulder, said fingers each having extending generally axially inwardly from the bottoming shoulders extension portions engageable with the intermediate flange for centering and cushioning retention of the cover.

7. In a wheel structure including a tire rim including a terminal flange having a radially extending inner portion and an axially extending outer lip portion with cover retaining members carried by the terminal flange and having shoulders facing radially and axially inwardly overlying said radially extending portion, a cover for disposition over the outer side of the wheel including a marginal portion having therebehind cover-retaining flange means with retaining shoulder structure engageable in snap-on, pry-off relation with said member shoulders, said flange means having heating shoulder structure axially inwardly from said retaining shoulder structure engageable with the radially extending rim flange portion and supporting the cover margin in spaced substantial gap relation to the terminal flange, said seating shoulder being accessible to and engageable by a pry-off tool inserted through said gap between the cover margin and the terminal flange for effecting pry-off leverage.

8. In a wheel structure including a tire rim including a terminal flange having a radially extending inner portion and an axially extending outer lip portion with cover retaining members carried by the terminal flange and having shoulders facing radially and axially inwardly overlying said radially extending portion, a cover for disposition over the outer side of the wheel including a marginal portion having therebehind cover-retaining flange means with retaining shoulder structure engageable in snap-on, pry-off relation with said member shoulders, said flange means having seating shoulder structure axially inwardly from said retaining shoulder structure engageable with the radially extending rim flange portion and supporting the cover margin in spaced substantial gap relation to the terminal flange, said seating shoulder being accessible to and engageable by a pry-off tool inserted through said gap between the cover margin and the terminal flange for effecting pry-off leverage, the cover having radially inwardly adjacent to said seating shoulder an annular pry-off shouder which is alternatively engageable by the pry-off tool inserted between the cover margin and said terminal flange and past the flange means.

9. In a wheel structure including a portion having circumferentially spaced cover retaining shoulder members providing retaining shoulders that face generally axially inwardly, a cover member over the outer side of the wheel having portions thereof retainingly aligned with said shoulder members and having socket apertures therein into which said shoulder members project, said socket apertures being defined on the axially inner sides thereof with turned back and flattened portions of the material struck from the apertures reinforcing said axially inner sides and providing reinforced shoulder edges retainingly thrusting against the shoulders of said members.

References Cited in the file of this patent
UNITED STATES PATENTS

| | | |
|---|---|---|
| 826,292 | Truxall | July 17, 1906 |
| 2,561,160 | Weasler | July 17, 1951 |
| 2,624,640 | Lyon | Jan. 6, 1953 |